Patented June 12, 1934

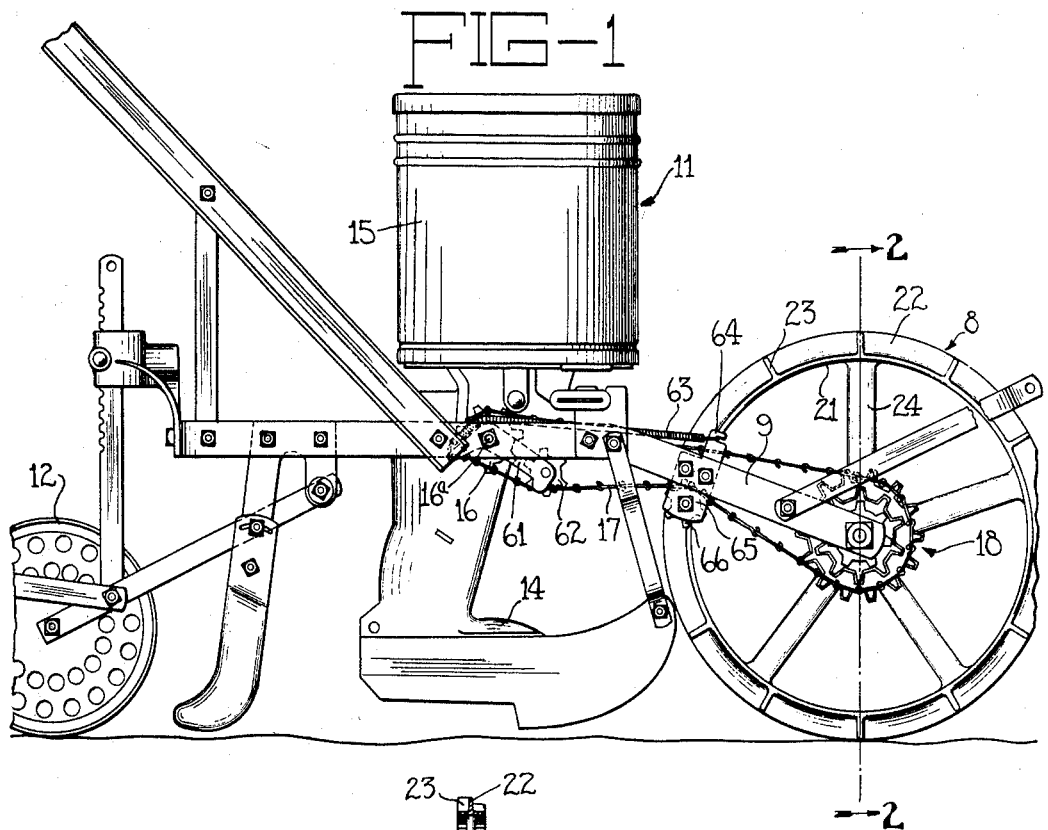

1,962,223

UNITED STATES PATENT OFFICE 1,962,223

SELECTIVE SPEED TRANSMISSION

Charles H. White, Moline, Ill., assignor to Deere & Company, Moline, Ill., a corporation of Illinois Application June 13, 1931, Serial No. 544,138

5 Claims. (Cl. 74—31)

My invention relates to a selective speed transmission particularly adapted for use for varying the speed at which the seed selecting mechanism of a planter is operated.

The main object of my invention is to provide a selective speed transmission comprising a plurality of drive sprockets of gradually increasing diameter which may be selectively used to change the speed of operation of the mechanism to be driven thereby, so mounted as to require the minimum of space necessary for shifting a selected one into alignment with the drive sprocket of the driven mechanism. I accomplish this object by recessing the web of each sprocket of the transmission, except the smallest one, sufficiently to receive the next smaller sprocket therein. The smaller sprocket is fixedly mounted in line with the drive sprocket of the driven mechanism, and the others are mounted for axial sliding movement relative thereto. By this arrangement any one of the sprockets can be brought into alignment with the drive sprocket of the driven mechanism by sliding it over the intermediate and smallest sprockets.

A further object is to provide a novel chain tensioning mechanism for use in conjunction with the transmission for automatically taking up the slack in the drive chain when changing from one sprocket to another without removing links therefrom. This mechanism comprises an idler sprocket journaled on the end of one arm of a pivoted bell crank located near one of the sprockets over which the drive chain is trained. A tension spring connected to the other arm maintains the idler sprocket in engagement with the chain and takes up the slack therein.

Other objects and advantages of my invention will be apparent to those skilled in the art after a consideration of the following detailed description, taken in conjunction with the accompanying drawing which illustrates a planter in which my improved selective speed transmission and novel chain tensioning mechanism has been incorporated. The planter is of the single row horse drawn type wherein power for driving the seed selecting mechanism is derived from a ground wheel.

In the drawing:

Figure 1 is a side elevational view of a planter in which my improvements are included;

Figure 2 is a sectional view taken on the line 2—2 of Figure 1 and showing the large drive sprocket in position to be engaged with the drive chain;

Figure 3 is a sectional view similar to Figure 2 showing the large sprocket shifted to one side so that the intermediate sprocket may engage with the drive chain;

Figure 4 is a sectional view similar to Figures 2 and 3 but showing both the large and intermediate sprockets shifted to one side so that the small sprocket may engage with the drive chain; and, Figure 5 is a sectional view taken on the line 5—5 of Figure 2.

The planter illustrated in Figure 1 includes a front drive wheel 8 which supports the front end of a U-shaped frame 9, a portion of said frame inclining rearwardly from the wheel to a horizontal portion upon which is mounted a conventional planting unit 11. A covering wheel 12 supports the rear end of the frame 9 in the usual way.

The planting unit 11 includes a furrow opener 14 and seed can 15. A seed selecting mechanism is provided in the bottom of the seed can 15 and is operated by the sprocket 16 mounted on the shaft 16a and which is driven by chain 17 selectively engaging one of the drive sprockets in a sprocket nest 18 to be described later.

The drive wheel 8 comprises a rim 21 having a central peripheral flange 22 and transverse lugs or grousers 23 equidistantly spaced around the wheel at each side of the flange 22. Spokes 24 are formed integral with the rim 21 and extend inward and are secured by bolts 25 to the hub 26. Spindles 27 and 28 extend laterally from opposite sides of the hub 26 and are formed integral therewith. An axle 29 is journaled in the hub 26 and spindles 27 and 28, the ends thereof being reduced at 31. The reduced ends 31 of the axle 29 engage holes in the side bars of the frame 9, said ends 31 being threaded to receive nuts 32. The nuts 32 securely clamp the side bars of the frame 9 against the axle 29, thereby forming a spool upon which the wheel hub may freely rotate. A longitudinal key 34 is formed integral with the spindle 28 and extends substantially the length thereof.

The small sprocket 35 of the sprocket nest 18 is fixed on the end of the spindle 28, said sprocket having a keyway which engages the key 34 on the spindle. The intermediate sprocket 36 of the sprocket nest 18 is provided with a long inwardly extending hub 37 slidably mounted on the spindle 28. The hub 37 is provided with a longitudinal keyway 38 which engages the key 34 on the spindle 28. The web of the intermediate sprocket 36 is recessed or dished so as to extend over the sprocket 35 and permit the teeth to be aligned with those on said sprocket 35. The large sprocket 39 is also recessed so as to extend over the sprocket 36 and permit the teeth to be aligned with those on the sprockets 35 and 36. A hub 41 extends inwardly from the sprocket 39 and is slidably mounted on the hub 37 of the sprocket 36. The hub 41 is provided with a keyway 42 adapted to engage the outer surface of the keyway 38 on the hub 37. By this construction the sprockets 35, 36 and 39 rotate with the drive wheel 8 and by reason of their being shiftable into alignment, that is, into the same vertical plane, the drive chain 17 may engage any one of the sprockets without being offset laterally.

To secure the sprockets 36 and 39 in a position in or out of alignment with the drive chain 17 the following mechanism is provided. A bracket 43 is formed on the sprocket 39 and extends inwardly therefrom. A locking pin 44 extends through a hole adjacent the end of the bracket 43 and through an aligning hole in the hub 41. A cotter 45 is provided adjacent the end of the pin 44 and a spring 46 is interposed between this cotter 45 and the lower face of the bracket 43. Holes 48 and 49 are provided in the hub 37 and recesses 51 and 52 are provided in the key 34 and are spaced so as to align with the holes 48 and 49 when the sprocket 36 is in the plane of the sprocket 35.

When it is desired to drive the chain 17 with the large sprocket 39 the said sprocket is shifted to the proper position and secured by means of the pin 44 engaging the hole 48 and the recess 51 as shown in Figure 2. When the intermediate sprocket 36 is to act as the driver the pin 44 is lifted out of engagement with the hole 48 and recess 51 and the sprocket 39 is then shifted inwardly so that the pin may engage the hole 49 and recess 52 thereby leaving the sprocket 36 in a position to be engaged by the chain 17 as shown in Figure 3. Figure 4 shows both sprockets 36 and 39 shifted inwardly and secured by means of the pin 44 engaging the hole 48 and recess 52, thereby presenting the sprocket 35 for engagement with the drive chain 17. The difference in slack in the chain 17 occasioned by shifting the chain from one size sprocket to another is taken up by the chain tensioning mechanism to be described presently. From the above description it will be seen that the drive sprockets 36 and 39 may be shifted into or out of alignment with the sprocket 35 and that the space required by the sprocket nest is only equal to twice the width of one sprocket plus a space for clearance for the drive chain 17. It is to be understood that while I have employed three sprockets, a larger number may be used and each being received in the recessed web of the next larger one in a similar manner without materially increasing the width of space required.

The chain tensioning mechanism is provided to take up slack which is caused by shifting the drive chain from engagement with the large sprocket into engagement with one of the smaller ones and thereby eliminates the necessity of removing links therefrom. This tensioning mechanism comprises a bell crank 61 pivoted on the shaft 16a. An idler sprocket 62 is mounted on the forward end of the bell crank and engages the drive chain 17. A spring 63 engages the opposite end of the bell crank and extends forwardly over the shaft 16a to engage a hook 64 formed on a bracket 65 secured to the frame 9. This bracket 65 also projects below the frame 9 and an idler sprocket 66 is mounted thereon and engages the lower side of the drive chain. The tension of the spring 63 on the bell crank 61 causes the bell crank to pivot about the shaft 16a and maintain the sprocket 62 in constant contact with the drive chain 17. When the drive chain is engaged with one of the smaller sprockets the bell crank is rotated about the shaft 16a by the spring 63 thereby rocking the sprocket 62 rearward a distance sufficient to take up the slack in the drive chain. When the chain 17 is trained over the smallest sprocket 35, arm 61 is swung rearwardly sufficiently to position the idler sprocket 62 back of or beyond sprocket 16. By pivoting the bell crank 61 on or in close proximity to the axis of the sprocket a shorter arm is required for the idler sprocket, to take up slack in the drive chain, by reason of the fact that the idler sprocket on the bell crank can swing beyond the axis of the sprocket thereby taking up the slack in the chain faster than if the bell crank were supported remote from the sprocket.

From the foregoing description it will be readily apparent that to change the speed of operation of the seed selecting mechanism relative to the speed of forward advance of the implement it is merely necessary to lock one or both of the larger sprockets 36 and 39 in the laterally offset position so that the drive chain 17 may engage the remaining aligned sprocket. The slack which occurs in the drive chain when it engages one of the smaller sprockets is automatically taken up by the chain tensioning mechanism as previously described. A distinct advantage is obtained from this construction in that the speed of the seed selecting mechanism may be varied without the necessity of removing sprockets from the drive wheel sleeve or links from the drive chain. A saving of time is therefore experienced in changing the speed of the driven mechanism and the implement is maintained intact.

While I have described in connection with the accompanying drawing the specific form in which I prefer to embody my invention, it is to be understood that the invention is not to be limited to the specific means which I have herein shown and described and that in fact widely different means may be employed in the practice of the broader aspects of my invention.

What I claim, therefore, and desire to secure by Letters Patent is:—

1. The combination of a driven mechanism having a driven sprocket, with a selective speed transmission comprising a spindle, means for rotating said spindle, a plurality of drive sprockets of different diameters mounted on the spindle and rotated thereby, the smallest of said drive sprockets being fixed to said spindle in alignment with the driven sprocket of said driven mechanism, and the remaining of said drive sprockets separately slidable on said spindle relative to the smallest drive sprocket and having their web recessed sufficiently so that each sprocket may be slid over the next smaller one to bring the teeth thereof in the same plane, whereby the teeth of any sprocket may be brought into alignment with said driven sprocket, and means carried by one of said sprockets for optionally locking all the slidable sprockets in a position of alignment with said driven sprocket or in a position out of alignment with said driven sprocket.

2. The combination of a driven mechanism having a driven sprocket, with a selective speed transmission comprising a spindle, means for rotating said spindle, a plurality of drive sprockets of different diameters mounted on the spindle and rotated thereby, the smallest of said drive sprockets being fixed to said spindle in alignment with said driven sprocket, the intermediate drive sprocket having a hub extending laterally from one side of the web and slidable on the spindle, the large drive sprocket having a hub extending laterally from one side of the web and slidable on the hub of the intermediate drive sprocket and each of the slidable sprockets having its web recessed sufficiently so that each sprocket may be slid over the next smaller one to bring the teeth thereof in the same plane, a pair of spaced holes in the hub of the intermediate sprocket, a pair of spaced recesses in the spindle adapted to align with the holes in the intermediate sprocket hub when said sprocket has been slid over the fixed sprocket, a bracket mounted on the large sprocket, and a pin supported in the bracket and in the sprocket hub and adapted to selectively engage the holes in the intermediate sprocket hub and the recesses in the spindle for selectively locking the slidable sprockets into or out of alignment with the driven sprocket.

3. The combination of a driven mechanism having a driven sprocket, with a selective speed transmission comprising a spindle member, means for rotating said spindle member, a pair of drive sprockets of different diameters mounted on said spindle member and rotated thereby, the smallest of said drive sprockets being fixed to said spindle member in alignment with the driven sprocket of said driven mechanism, and the other drive sprocket having a hub member slidable relatively to said spindle member and having its web recessed sufficiently so that it may be slid over the smaller drive sprocket to bring the teeth thereof into alignment with said driven sprocket, and means on one of said members and adapted to engage the other of said members for optionally locking the slidable drive sprocket in a position of alignment with said driven sprocket or in a position out of alignment with said driven sprocket.

4. A selective speed transmission comprising a driving and a driven member, a sprocket on one of said members, a pair of sprockets of different diameters on the other member, the smallest sprocket of the pair being fixed to said other member in alignment with said first sprocket, the larger sprocket of said pair having a hub extending laterally from one side thereof and being slidable relative to the smaller, said larger sprocket having its web recessed sufficiently so that it may be slid over the smaller one to bring the teeth thereof into alignment with said first sprocket, and a latch mounted on said larger sprocket and adapted to engage said hub and said spindle for optionally locking said larger sprocket into or out of alignment with said first sprocket.

5. In a selective speed transmission comprising a driving device and a driven device, one of said devices comprising a spindle member, the other of said devices having a wheel fixed thereto, a pair of wheels of different diameters on said spindle member, the smallest wheel of said pair being fixed to said spindle member in alignment with said first wheel, the larger wheel of said pair having a hub member extending laterally from one side thereof and slidably disposed upon said spindle member for sliding movement relative to said smaller wheel, said larger wheel having its web recessed sufficiently so as to be slidable over said smaller wheel to bring the teeth of said larger wheel into alignment with said first wheel, and locking means mounted on one of said members and adapted to engage the other of said members for optionally locking said larger wheel into or out of alignment with said first wheel.

CHARLES H. WHITE.